Dec. 16, 1930. W. H. SMITH 1,785,427
COMBINED ORE REDUCING AND HYDROCARBON REFINING APPARATUS
Filed Dec. 27, 1926 2 Sheets-Sheet 1
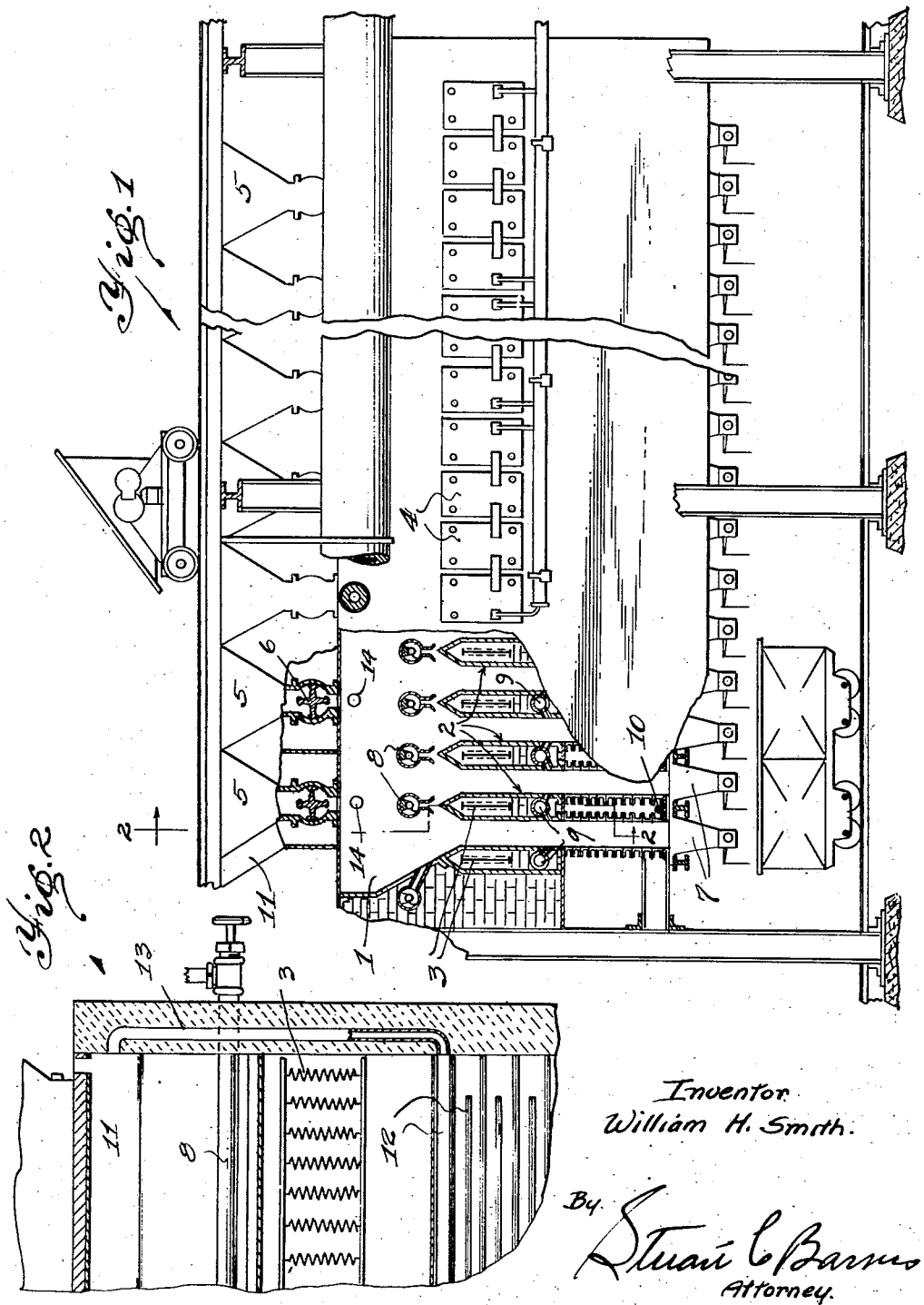
Inventor
William H. Smith.
By
Stuart C. Barnes
Attorney.

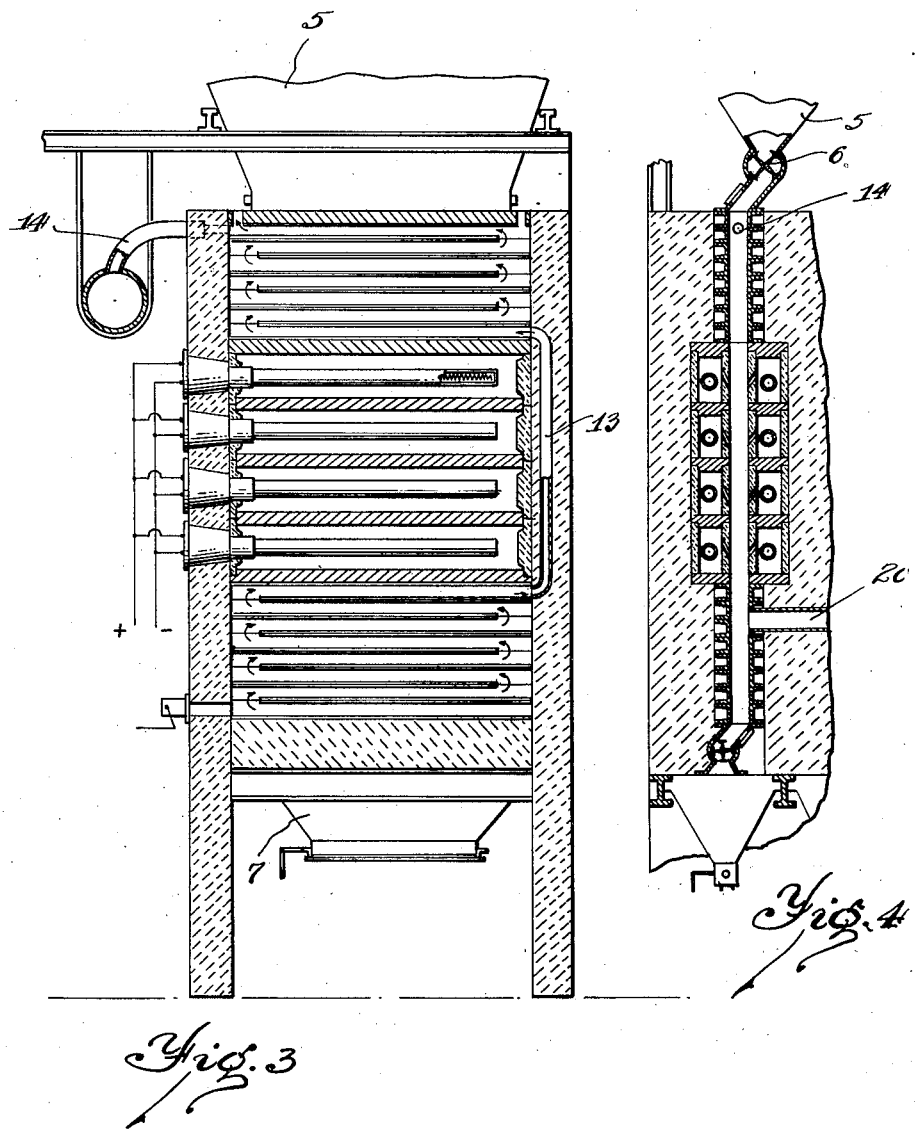

Patented Dec. 16, 1930

1,785,427

UNITED STATES PATENT OFFICE

WILLIAM H. SMITH, OF DETROIT, MICHIGAN

COMBINED ORE-REDUCING AND HYDROCARBON-REFINING APPARATUS

Application filed December 27, 1926. Serial No. 157,225.

This invention relates to a combined ore reducing and hydrocarbon refining apparatus. It has to do particularly with a novel furnace or oven structure for reducing iron oxide without melting, and in a very simple, inexpensive and efficacious manner, and at the same time providing novel means for refining or cracking hydrocarbons, such as petroleum oils.

In the past in the reducing of metallic oxides many devices have been designed in an attempt to reduce the metallic oxides, or more particularly, iron ore, to a sponge iron, but such devices have been unable to produce true sponge iron on a commercial scale and at a production cost that would permit its use in the manufacture of commercial iron and steel. Sponge iron of a good grade has been produced but the manner of producing such sponge iron has made its use almost prohibitive on account of the heat units required and the resultant cost of manufacture. Where ore reducing apparatus has been used to reduce ore without melting such devices have been designed solely for the reduction of the ore, and a few have been designed for recovering certain gases released by the reducing reaction, such as carbon monoxide (CO).

My invention has to do primarily with the provision of a reduction and refining oven of the type where the ore to be reduced is fed substantially continuously as a solid mass, and which oven is provided with a series of electrical heating units whereby the heat is created and applied at intervals through the mass of ore to be reduced. As a result of such a structure substantially all the heat radiated from said heat units is absorbed by the mass of ore to effect reduction thereof and thus at the same time make the losses of heat by radiation negligible. A further valuable result of this apparatus lies in the use of the electrical heating units which operate on the resistance principle whereby a relatively low heat is supplied to the ore by conduction, and whereby the heat produced is just the right amount, or in other words, the heat required in the reducing process is gradually obtained by the resistance units until just the right amount of heat has been obtained instead of heating the furnace up to a high heat and then bringing it down to the correct reducing temperature. This process effects a great saving in heat consumption and also results in efficient production.

A further object of the present invention has to do with the provision of a progressive heating zone in an ore reducing furnace, and novel means for controlling the introduction of hydrocarbons, such as petroleum oils, into the reducing furnace whereby the hydrocarbon assists in the reduction of the ore by acting either as a reducing agent or a cooling agent. A still further object of this invention has to do with the provision of two or more catalytic agents permanently or temporarily positioned in or forming a part of the reduction furnace whereby to effect cracking or refining of the heavy hydrocarbons, or the production of a fixed gas of a high hydrogen or methane content, or both.

A further feature of the present invention has to do with the provision of a novel retort or series of retorts through which ore is designed to be passed, and the feeding and delivering means of such structure is such that the reduction of the ore and the refining of the hydrocarbons in the retort or retorts may be accomplished under pressure. Various other novel features of this invention will be apparent as this description progresses and will be brought out in the claims appended hereto. The preferred embodiment of my invention is shown in the accompanying drawings wherein similar characters of reference designate corresponding parts, and wherein:

Fig. 1 is a front elevation, partly in section, of a combined ore reducing and hydrocarbon refining furnace and showing the preferred manner of arranging the electric heating units.

Fig. 2 is a fragmentary transverse section taken on line 2—2 of Fig. 1, the lower part of the structure being shown provided with alternate baffles instead of radiating fins.

Fig. 3 is a transverse sectional view illustrating a modified form of heating elements and flues, and manner of arranging the same.

Fig. 4 is a fragmentary transverse section taken through one of the retorts formed by the structure shown in Fig. 3.

This application is a continuation in part of my prior pending applications Serial Nos. 88,774, filed Feb. 17, 1926 and 144,761, filed Oct. 28, 1926.

It will be understood that various types of furnaces may be utilized in effecting my novel invention, but the preferred form of furnace structure for carrying out the invention of the present application comprises a furnace, such as is illustrated in Fig. 1, and which comprises a retort which may be generally designated 1. This retort preferably extends the length of the furnace and is preferably open at the top, as shown in Fig. 1 whereby to receive a contiguous mass of ore. This retort is preferably of general rectangular shape, and is preferably divided up into a series of smaller retorts by means of heat units 2 which preferably extend transversely of the retort container 1, and which are also pointed at the top, as best shown in Fig. 1 so as to divide the mass of ore up into separate columns which are relatively long and narrow in cross section. These heating elements 2 may be of any size desired and arranged in any manner desired as long as the general mass of ore is broken up and the heat applied at intervals in the ore body, or in other words, the heating units should be so arranged that all the heat radiated therefrom will be absorbed by the surrounding mass of ore.

These heating elements preferably extend across the furnace and are hollow in the upper portion thereof to receive suitable electrical resistance elements which may be designated 3. The wall of the furnace is provided with suitable covers 4 whereby the resistance elements may be removed and replaced as desired. The ore which is designed to be fed en masse into the furnace to surround the heating elements and to be in turn divided up by said heating elements is adapted to be fed into the furnace by means of suitable hoppers 5 and by means of suitable revolving valve members 6. Suitable valve members or hoppers 7 are provided at the bottom of each retort formed by the heating elements 2 and both the valve 6 at the top and the valve 7 at the bottom are air tight whereby to permit the reducing of the ore, or the refining of the hydrocarbons, or both, under pressure. It will be obvious that the feeding valve 6 may be rotated at any speed desired whereby the reduction of the ore and the resulting production may be accurately controlled.

I preferably provide a series of valve inlets 8 and 9. In the drawings I have shown the inlets 8 positioned just above the heating elements 2 to feed the hydrocarbons into the furnace at a point above the reaction or reduction zone. The inlets 9 are preferably provided within the heating units 2 whereby the hydrocarbons, such as petroleum oil may be fed into the bottom part of the heating units, as at 10, and then conducted to the inlets 9 whereby the reduced ore will be cooled and the hydrocarbons will be heated, the heated oils being conducted to the inlet ports 9 and will then be discharged in this heated condition into the retort passageways, preferably just below the reducing zone. I have shown two preferred places for introducing the hydrocarbons into the closed retort of the furnace, but it will be understood such inlet ports may be arranged as desired whereby to submit the incoming hydrocarbons to the required temperature in accordance with the quality of hydrocarbons desired.

The hoppers 5 are preferably enclosed by suitable casings 11 whereby the incoming ore may be preheated if desired. In Fig. 2 I have shown a slightly modified form of furnace in that the bottom part of the heating element 2 is divided up into a series of alternately positioned baffles 12. When such a modified structure is used the hydrocarbons are preferably fed directly into the furnace through either of the inlets 8 and 9 without preheating. In this arrangement air is introduced into the baffles 12 forming the lower part of the heating elements, and as this air is conducted back and forth by the baffles it serves to cool the reduced ore and to be in turn heated. The heated air is then preferably conducted by means of suitable conduits 13 to surround the hoppers 5 to thus preheat the incoming ore.

Suitable outlet conduits 14 are provided to communicate with the interior of the retort 1. As this retort is entirely closed and the ore and hydrocarbons heated by conduction, it will be obvious that many gases will be formed, particularly so by my process, and such gases will be conducted away whereby they may be separated and utilized as by-products.

Although the ore is continuously fed to my novel furnace for reduction purposes and forms a catalyzer with respect to the hydrocarbons, I preferably in addition to such metallic oxides introduce a suitable catalyzer which may be either nickel or chromium. Such catalyzer may be introduced as separate or combined elements with the ore and reducing agents, or preferably the walls of the retorts may be completely made from the same, or partly coated or plated as desired.

In the operation of my furnace the ore is fed continuously through the hoppers 5 and into the top part of the main furnace or retort 1. It will be obvious that the thin flat retorts will be filled up and that the ore will then be fed as a unitary mass into the top of the main retort. The temperature of the heating units may be maintained at a relatively low temperature by means of the electrical resistance units. By reason of such electrical units the temperature of such units may be gradually brought up to the desired point and then accurately controlled and maintained at such point. This is in direct contrast to the heating means employed by other ore reducing furnaces where the heating means usually attain a relatively high temperature at point of combustion which must be lowered before fairly good results may be obtained, and even when lowered, such heating means of the prior art have been very difficult to maintain.

My resistance units are within the mass of ore to be reduced and are so enclosed as to heat the ore by conduction. This heat may preferably be around 1800° to 2000° F., but the particular heat to which such units are maintained may vary considerably within the desires of the operator, the production required and the quality of ore being reduced. The point is that the heat is applied within the mass of ore and is accurately controlled to be maintained at the correct reducing temperature, which is a relatively low temperature, sufficient to cause desired reaction between the ore and the reducing agents. The speed that the ore is moved within the retorts, or in other words, the speed of the feeding through the valve 6 and out of the valve 7, is such as to accurately regulate the flow of ore through the furnace whereby to get complete reduction. The ore after passing through the reducing zone, which is located closely adjacent to the resistance units, will then be effectively cooled by reason of the long thin streams. This cooling action is obtained by the passing of a cooling medium through the lower part of the heating units 2 to absorb the heat units from the reduced ore, or else this heat may be absorbed by the passing of reducing gases up through the hollow lower portion of such heating units 2. The ore, when delivered through the hoppers 7, will then be comparatively cool whereby it may be received in suitable receptacles as reduced sponge iron and at sufficiently low temperatures without oxidization.

When my apparatus is to be used as a combined ore reducing and hydrocarbon refining or cracking furnace, the hydrocarbons, such as petroleum oil may be introduced through the valve inlets 8 or 9, or at any other point or points desired. The oxides passing through the retorts to be reduced constitute one catalyzing agent while the nickel or chromium lined retort walls may constitute another catalytic agent.

The heavier hydrocarbons will be refined or broken up and changed into lighter liquids, or into gases forming lighter liquids in the presence of the catalyzer or catalyzers. The lighter gases coming from the hydrocarbons will be controlled by the nickel or second catalyzer to prevent them from combining with the oxygen to form water vapors. In this manner lighter hydrocarbons are formed at relatively lower heat temperatures than take place in the so called cracking process of refining hydrocarbons as a second and stronger catalytic agent will be present in the continuously passing ore, being mixed with the ore or formed in the walls of the retort. The iron oxide as it passes through the reducing zone will release its oxygen to the carbon present and be reduced to sponge iron, the oxygen combining with the carbon of the reducing agent forming carbon monoxide (CO) at the relatively low temperature of reduction maintained by the electrical furnace. As a result of this arrangement and catalytic reaction the hydrogen is released and with carbon forms a fixed gas, such as methane ($CH_4$) due to the presence of the nickel or chromium as catalyzers. It will thus be seen that by continuously passing the oxides through my retorts and adding a heavy hydrocarbon, such as petroleum oil, that I am able to change or crack the heavier hydrocarbons, preferably into lighter liquids and also to produce a higher and richer gas containing hydrogen or hydrogen compounds and gases, such as methane of high heat value.

It will be understood that water vapors may be broken up by this arrangement by passing the water vapor through the mass of materials in the reduction chamber in the presence of the reaction between the oxide of the ore and carbon and in the presence of a catalyzer. Hydrogen is separated by this reaction from oxygen as a hydrocarbon, or passes off as hydrogen, the oxygen forming carbon monoxide. It will further be understood that suitable reducing agents may be fed into the retorts together with the ore when such ore is fed through the hoppers 5, and it will also be understood that I do not limit myself to the refining of hydrocarbons of the petroleum series, but that coal, oil shales, wood, vegetable products, beet sugar and cane pulp, and other similar material may be fed into the retort, or retorts, in place of the petroleum hydrocarbons.

When the hydrocarbons are added to the reduced metal and below the reduction zone it serves as a means of cooling such reduced metals as the gases formed absorb the heat units and pass upwardly through the higher temperature zones and react with the oxides under catalytic influence. Due to the fact that I utilize electrical resistance units a high combustion point is never reached as the correct reduction temperature is fixed by the products desired, and the temperature of the furnace is built up to such fixed temperature at which I am able to get a CO gas at all times instead of a $CO_2$ gas which occurs under a higher heat. Furthermore, my apparatus never becomes clogged because I am able to control the heat accurately and the temperature never runs away with the furnace and therefore never results in slag or the production of clinkers.

In the use of the modified form of apparatus illustrated in Figs. 3 and 4 where banks of individual retorts are utilized it will be understood that in some cases it will be preferable to add the ore to be reduced in one retort and to add the reducing materials or hydrocarbons in another adjacent retort particularly when such reducing materials or hydrocarbons contain coking tars which might cause caking of the ore mass after the same has been reduced to sponge iron. When the ore and the reducing materials or other combined materials are added in separate streams, I preferably provide only the ore enclosing retorts with outlets 14 at the top and provide a suitable passageway 20 between the ore conducting retort and the adjacent retort for conducting the reducing material. By this construction both columns of the material will be heated and the gases from the reducing material in the adjacent retort or retorts will be conducted to the retort for conducting the ore to be reduced. These gases will pass upwardly through the mass of ore and react with the same to cause reduction. Heavier tars, or other coking substances may then be removed in separate streams from the reduced ore.

When the hydrocarbon oils are introduced in the interior of the heating units 2 to effect cooling of the reduced ore, such oils will be partially refined and the lighter liquids and gases will pass upwardly and out into the retorts through the valves 9. The heavier hydrocarbons and tars or other heavier material left behind may then be drained off as desired. Such lighter hydrocarbons and gases may then be introduced into the retorts or ore streams at a point beneath the reducing zone, and the gases passing upwardly will react with the ore at the reducing zone to effect reduction. When it is desired to introduce the hydrocarbons or other reducing materials at a point above the reduction zone the coke or carbon produced will react with the oxygen in the ore to cause a reduction of the ore. Thus the hydrocarbon or other reducing agents added above the reducing zones are preferably those which contain coking tars.

It will also be understood that I may use any form of catalyzing material to effect the result desired, and do not limit myself to nickel or chromium or a combination of the two. It will be obvious that with the iron oxides passing continuously through the ovens that a catalyzing agent may be added which will pass through with the ore and will be in close association therewith at the time of reaction. One manner of adding such catalyzing material will be in the form of nickel shot, or nickel gauze which are easily regainable after they have been passed through the retorts.

It will be understood that although I have in the specification and claims referred to the imparting of the heat to the ore within the mass thereof by conduction, it will be obvious that a portion of such heat will be imparted by radiation and partly by convection. However, the majority of the heat transferred will be by conduction and I have utilized this term for such transfer of heat for the reason that the heating elements are almost entirely enclosed within the mass of ore to be reduced and the reduction of the ore is obtained entirely within enclosed retorts. In using the term "continuous" in this specification and claims as designating the manner of feeding the ore and other materials through the retort or retorts it will be understood that I do not limit myself to any specific manner of feeding the ore through the retorts, but that such ore may be fed intermittently or otherwise so long as the mass of ore travels substantially continuously through the retorts. In other words that time of feeding the ore to, or delivering the sponge from the retorts may vary somewhat as long as there is a general movement of the ore through the retorts to distinguish from the method of filling up of the retort full of ore, reducing the entire mass, removing the same as a unit and then filling it up again.

Having thus described my invention, what I claim is:

1. Apparatus of the type described comprising a retort for receiving one or more continually moving streams of ore and a heat unit positioned intermediate the ends of and substantially confined within the mass of continually moving ore to define a fixed limited heating zone, the heat being produced by electrical resistance means.

2. Apparatus of the type described comprising an enclosed retort for receiving one or more continually moving streams of ore and a heat unit positioned intermediate the ends of and substantially confined within the mass of continually moving ore, the heat unit comprising an enclosed electrical resistance means of limited length to define a fixed heating zone, through which the ore must pass.

3. A combined ore reducing and hydrocarbon refining apparatus comprising a retort, a heat unit forming a fixed temperature reducing zone of limited length, means for continuously feeding the ore to be reduced through said retort and past said zone, and means for adding hydrocarbons at a predetermined point in said retort relative to said zone whereby the hydrocarbons will be refined in the presence of the continuously moving ore.

4. A combined ore reducing and hydrocarbon refining apparatus comprising means for receiving and maintaining a body of ore under pressure, a heating unit consisting of an enclosed electrical resistance means within said body of ore for applying heat thereto, and means spaced from said heating unit for introducing hydrocarbons into said body of ore at one or more predetermined points whereby the hydrocarbons will be refined in the presence of the ore acting as a catalyzer under a given temperature and pressure.

5. A combined iron ore reducing and hydrocarbon refining apparatus comprising one or more enclosed retorts for receiving ore to be reduced, means for continually passing the ore through said retort, or retorts, the walls of said retort or retorts being provided with a catalyzer, and means for adding a hydrocarbon to the mass of ore, the ore acting as one catalyzer with respect to the hydrocarbon and the catalyzer in the walls of the retort, or retorts, acting as a second catalyzer.

6. Apparatus for refining hydrocarbons comprising a completely enclosed retort for receiving a continually moving stream of metallic oxide, means for feeding and continually moving said stream and sufficiently air tight to maintain said retort under pressure, and means extending through said retort for introducing hydrocarbons within said mass of continually moving ore.

7. Apparatus of the type described, comprising an enclosed container for receiving a metallic oxide and hydrocarbons as a mass, and means for dividing said mass into a plurality of continuously moving streams whereby to apply heat within said mass of oxides and hydrocarbons, said means comprising a plurality of enclosed electrical resistance units positioned with the container, the heat being initially imparted to the metallic oxide and hydrocarbon mixture by conduction.

8. Ore reducing apparatus comprising one or more closed retorts, means for continuously feeding a mass of ore in the form of a metallic oxide through said retort, or retorts, means for heating said continuously moving ore to cause reaction and reduction of the same, and a catalytic agent having the catalytic properties of nickel positioned in one or more of the retorts.

9. Apparatus of the class described, comprising one or more closed retorts, means for passing a continuous stream of iron ore through said retort, or retorts, means for applying heat to said mass of continuously moving ore, means for adding hydrocarbons to said mass of ore at a fixed point relative to said application of heat, and one or more catalytic agents having the catalytic properties of nickel positioned within the apparatus for contact with the charge.

10. Apparatus of the class described, comprising one or more closed retorts formed by spaced heating units, said units being spaced from the top of the apparatus to divide the ore into a plurality of small streams, means for passing a continuous stream of iron ore through said one or more retorts, means for applying heat to said mass of continuously moving ore to form a limited reducing zone, means for adding hydrocarbons to said mass of ore, and a plurality of catalytic agents including said iron ore positioned in said retort or retorts at a fixed point relative to said reducing zone for controlling the refining of the hydrocarbons.

11. Apparatus of the class described, comprising a main retort adapted to receive a supply of iron ore, and similar metallic oxide and a supply of hydrocarbons, such as petroleum oil, means for feeding said ore and hydrocarbons into said retort and heating units in the form of electric resistance elements positioned to form a plurality of retorts enveloped by said combined mass of ore and hydrocarbon, said resistance elements being spaced a predetermined distance from said feeding means.

12. In the art of reducing iron ore an enclosed retort adapted to receive a supply of iron ore, or similar metallic oxide and a supply of hydrocarbons, such as petroleum oil, one or more heating units in the form of enclosed electric resistance elements positioned to be enveloped by said combined mass of ore and hydrocarbon, said heating unit, or units, defining a reduction zone for the ore, means for continually moving ore through the retorts, and means for receiving the gases resulting from the heating of the hydrocarbons and reduction of the ore.

13. Apparatus of the type described, comprising one or more retorts, heating units positioned within said retort or retorts and means for feeding iron ore around and past said heating units, said heating units defining a zone for reduction of the ore, and means for introducing hydrocarbons into the mass of ore and at a point above the reducing zone and evenly distributed along the retort from front to back.

14. Apparatus of the type described, comprising one or more retorts, heating units positioned within said retort, or retorts, and means for feeding metallic oxides around and past said heating units, said heating units defining a zone of relatively small length compared to the length of said retort or retorts for reduction of the ore, a cooling zone below the reducing zone and means for introducing hydrocarbons into the mass of ore and at a point below said reducing zone.

15. In the art of reducing metallic oxides a combined ore reducing and hydrocarbon refining apparatus, comprising a retort for receiving the ore to be reduced, heating means positioned within the retort and adapted to separate the ore into a plurality of thin streams, means for continually feeding the ore through the retort, and means positioned relative to said heating means for adding hydrocarbons to the continually moving stream of ore at one or more predetermined points, and means for delivering the reduced ore at the bottom of the retort and for conducting away refined hydrocarbons at the top of the retort.

16. A combined ore reducing and hydrocarbon refining apparatus comprising a retort, electrical resistance heating means positioned within the retort for dividing the ore into a plurality of streams, and means positioned in the retort above said point of division for adding hydrocarbons at a predetermined point, or points, relative to said heating means.

17. A combined ore reducing and hydrocarbon refining apparatus comprising a retort, or retorts, for receiving the ore to be reduced, the wall or walls of said retort being lined with a material acting as a catalytic agent, gas tight means for feeding the ore to and the reduced ore from said retort, means for applying heat by conduction within the mass of ore, and means for adding heavy hydrocarbon oils to said retort.

18. A combined ore reducing and hydrocarbon refining apparatus, comprising an enclosed retort, or retorts, for receiving the ore to be reduced, and means for continually feeding the ore through the retort, or retorts, electrical resistance heating units positioned in the retort, or retorts, to be substantially surrounded by the passing ore, the electrical resistance means being positioned in the top part of the heating units, and means for conducting a relatively heavy hydrocarbon liquid up through the lower part of said heating unit or units, and then injecting the hydrocarbons into the streams of ore.

19. Apparatus of the class described, comprising an enclosed retort for receiving ore to be reduced, gas tight means for continually feeding the ore through the retort, and heat units extending upwardly from the bottom of the retort and being spaced from each other and from the top whereby to divide the contiguous mass of ore into a series of smaller streams.

20. Apparatus of the class described comprising a closed retort for receiving ore to be reduced, and a reducing agent, means for continually feeding ore into and through said retort, and heating units in the form of enclosed electrical resistance extending only a part way up into the retort.

21. Apparatus of the class described comprising a retort, electrical resistance heating means positioned within the retort for dividing the ore into a plurality of streams and means for adding materials for reaction with the ore at a predetermined point or points in said retort relative to said heating means.

22. A hydrocarbon refining apparatus comprising an enclosed retort, a completely enclosed heating unit therein for applying a predetermined heat to said hydrocarbons by conduction, and means for continually passing a new charge of catalytic agent into, through and out of said enclosed retort and apparatus.

23. Hydrocarbon refining apparatus, comprising a completely enclosed container for receiving a mixture of metallic oxides and a hydrocarbon, a completely enclosed heating unit extending within said mixture and presenting a heating zone of a relatively short fixed length compared to the length of said container and means within said container and adjacent said heating zone for presenting a cooling zone.

24. A hydrocarbon refining apparatus comprising a retort, one or more completely enclosed heating units therein for defining a zone of fixed length and fixed temperature, means for adding hydrocarbons to said retort at a predetermined point relative to said zone, and means for continually passing a fresh charge of solid catalytic agent entirely through and out of the apparatus.

In testimony whereof I affix my signature.

WILLIAM H. SMITH.